United States Patent Office 3,496,210
Patented Feb. 17, 1970

3,496,210
HYDROCYANATION OF TERMINAL ALKYNES
William C. Drinkard, Jr., Kynlyn, Wilmington, and Richard V. Lindsey, Jr., Hockessin, Del., assignors to E. I. du Pont de Nemours and Company, Wilmington, Del., a corporation of Delaware
No Drawing. Filed July 28, 1966, Ser. No. 568,384
Int. Cl. C07c *121/04*
U.S. Cl. 260—465                                    10 Claims

ABSTRACT OF THE DISCLOSURE

A process of hydrocyanating terminal alkynes of the formula RC≡CH, where R is H, alkyl groups of 1 to 6 carbon atoms or phenyl, to form unsaturated nitriles. The process involves contacting the alkyne with hydrogen cyanide in the presence of a nickel compound of the formula $Ni[MX_3]_n[CO]_{4-n}$, wherein M is P, As or Sb, $n$ is an integer of from 1 to 4 and X is R' or OR' where R' is an alkyl or aryl group of up to 18 carbon atoms. The temperatures used are from 30 to 200° C. and the pressures used are from 0.5 to 100 atm.

---

This invention relates to the hydrocyanation of certain terminal alkynes using certain catalysts formed of complexes of nickel.

The present process is generally applicable to terminal alkynes of the formula RC≡CH, wherein R is selected from the class consisting of hydrogen, alkyl groups of from 1 to 6 carbon atoms and the phenyl group. The products are nitriles having carbon-carbon unsaturation formed by addition of hydrogen cyanide to one of the unsaturate linkages in the reacting alkyne. Generally, the predominant product is formed by attachment of the cyano group to the internal carbon atoms of the triple bond and the minor product is formed by attachment of the cyano group to the external carbon atom. There also are produced minor amounts of unsaturated nitriles derived from the above products by migration of the carbon-carbon double bonds.

The catalysts are nickel compounds of the general structure $Ni[MX_3]_n[CO]_{4-n}$, where M is selected from the class consisting of P, As and Sb, where $n$ is an integer of from 1 to 4, wherein X is selected from the class consisting of R' and OR' wherein R' is selected from the class consisting of alkyl and aryl groups of from 1 to 18 carbon atoms. The preferred catalysts are those of the structure $Ni[P(OR')_3]_4$ wherein R' has the meaning defined above.

Suitable modifiers which enhance catalyst reactivity include Lewis acids such as zinc chloride, magnesium chloride, stannic chloride, aluminum chloride and triphenylboron. They are most effective when present at a mole ratio to catalyst of ca. 1:1, but variations from this ratio of from 1:16 to 40:1 modifier to catalyst can be used.

Trivalent phosphorus compounds, normally that one incorporates in the catalyst, modify the catalysts by extending their lifetimes and are desirable where inactivation of the catalyst is a problem. The amount of trivalent phosphorus compound employed is determined by the ease with which the catalyst is inactivated, and may vary from none for stable catalysts to a mole ratio to catalyst of 10:1 for catalysts that are easily inactivated.

Satisfactory techniques for preparing these nickel compounds may be found in U.S. Patent No. 3,328,443, issued June 27, 1967, to Reginald F. Clark and Charles D. Storrs. Other techniques for preparing these catalysts are described in J. Chatt and F. A. Hart, J. Chem. Soc. (London), pages 1378–1389 (1960) and by Lewis S. Meriwether and Marilyn L. Fiene, J. Am. Chem. Soc., 81, 4200–4209 (1959). Another technique for preparing these catalysts is disclosed in U.S. Patent 3,152,158, issued Oct. 6, 1964 to Reginald F. Clark.

There are several techniques for in situ preparation of the nickel compound. For example, nickel carbonyl and a ligand of the formula $PX_3$, wherein X has the meaning defined above can be added to the reaction mixture. It is preferred to wait until carbon monoxide evolution ceases before using the catalyst. A second technique involves adding the ligand (as defined above), a nickel II compound such as a nickel halide, e.g., $NiCl_2$, $Ni(CN)_2$ or Ni-bis-acetonylacetonate, and a reducing agent. In certain cases, such as in the case of $P(OC_2H_5)_3$, the ligand can serve as the reducing agent. Other suitable reducing agents are compounds of the structure $M'[BH_4]_x$, $M'[AlH_4]_x$, and $M'R'_x$, where M' is an alkali metal or an alkaline earth metal, R' has the meaning defined above, and $x$ is a number corresponding to the valence of the metal. This second method is a good method for preparing many of the catalysts for independent use. A third technique is to add dicyclopentadienyl nickel to a ligand of the formula $P(OR')_3$ where R' is an aryl radical of up to 18 carbon atoms. In each case, the catalyst is formed under the reaction conditions hereinafter described for hydrocyanation and no other special temperatures or pressures need be observed.

The hydrocyanation reaction may be carried out by charging a reactor with all of the reactants or preferably the reactor is charged with the catalyst, or catalyst components, the terminal alkyne and whatever solvent is to be used and the hydrogen cyanide gas is swept over or bubbled through the reaction mixture. If desired, when using a gaseous terminal alkyne, the hydrogen cyanide and the terminal alkyne may be fed together into the reaction medium. The molar ratio of terminal alkyne to catalyst generally is varied from 10:1 to 1000:1 for a batch operation. For continuous operation, such as when using a fixed bed catalyst type of operation, a much higher proportion of catalyst such as 1:2 terminal alkyne to catalyst is used.

Preferably, the reaction medium is agitated, such as by stirring or shaking. The hydrocyanation product can be recovered by conventional techniques such as by distillation. The reaction may be run batchwise or in a continuous manner.

The reaction may be carried out in the absence of a solvent, but is most conveniently conducted in the presence of an inert diluent. The amount of inert diluent preferred is the minimum amount required for dispersion of the catalyst to provide maximum contact between reactants and catalyst and for maintenance of effective temperature control. Generally, values of from 1 to 15 liters of diluent per mole of catalyst are effective.

The inert diluent must not contain functional groups capable of complexing tightly with the nickel catalyst. Generally, such solvents are liquid hydrocarbons, esters, or nitriles. Suitable diluents include benzene, toluene, xylene, biphenyl, octane, dioxane, tetrahydrofuran, acetonitrile, etc. The preferred specific diluent employed is defined by its ease of separation from the unsaturated nitrile products, and, in flow systems, by the reaction temperature at which it must be relatively non-volatile.

The temperature of reaction should be chosen high enough to produce a significant rate of reaction, but low enough to prevent telomerization of the acetylene and/or decomposition of the effective catalytic species. In flow systems, the boiling points of the solvent and products may also place a practical upper limit on the temperature which can be maintained. Depending on the particular catalyst and terminal alkyne employed, the reaction may be conducted in the temperature range of from 30 to 200° C. with from 50 to 120° C. being the preferred range.

The reactants, hydrogen cyanide and terminal alkynes, may be brought into reaction as gases or liquids. Atmospheric pressure is satisfactory for carrying out the present invention and hence pressures of from about 0.7 to 20 atmospheres are preferred due to economic considerations although pressures of from 0.5 to 100 atmospheres can be used if desired. The ratio (moles hydrogen cyanide/moles terminal alkyne) may vary from 0.1 to 10.0 but is most conveniently in the range, 0.5–1.5.

The following examples are illustrative of the invention.

EXAMPLE I

A 400 ml. shaker tube is charged with tetrakis [triethyl phosphite]nickel, $Ni[P(OC_2H_5)_3]_4$, (10.0 g., 0.0138 mole), 10 ml. of benzene and 39 ml. (1.0 mole) of hydrogen cyanide. The tube is sealed, charged with 40 g. (1.0 mole) methacetylene, and heated at 100° C. for 8 hours under autogenous pressure. The tube is then cooled and vented, and the crude product is collected as an orange solution (29.1 g.; 43 percent yield as butenenitriles). Gas chromatography of the crude product reveals the presence of one butenenitrile in preponderance, and this component is isolated and identified as methacrylonitrile by infrared spectroscopy.

EXAMPLE II

Into a 300 ml. flask which is equipped with a water-cooled condenser, gas inlet and outlet tubes and a magnetic stirrer which is maintained under an atmosphere of nitrogen is added a slurry of 4.0 g., (0.00308 mole) tetrakis[triphenyl phosphite]nickel, $Ni[P(OC_6H_5)_3]_4$, in 50 ml. of p-xylene. Stirring is started, and the flask is immersed in an oil bath maintained at 120° C. A gaseous mixture of methylacetylene (flow rate, 0.00262 mole/min.), hydrogen cyanide (flow rate, ca. 0.00166 mole/min.) and nitrogen (flow rate, ca. 5 ml./min.), at a total pressure of one atmosphere, is passed into the flask. After 235 minutes (when 0.390 mole of hydrogen cyanide has been introduced) the reaction is discontinued, the flask is cooled, and the contents are evaporatively distilled at room temperature and 0.02 mm. of Hg pressure. The residue amounts to 4.9 g., and the distillate of volatile components, including butenenitriles, amounts to 51.8 g. Gas chromatography of the distillate reveals a single butenenitrile as the preponderant product, and this component is isolated from the gas chromatograph and is identified as methacrylonitrile by infrared and nuclear magnetic resonance spectroscopy. A combination of gas chromatography and nuclear magnetic resonance spectroscopy permits quantitative analysis of the reaction product. A known weight of 1,2-dichloroethane is added to a known weight of the distillate, and the resulting mixture is subjected to gas chromatography, methacrylonitrile and 1,2-dichloroethane being collected in a single trap as they emerge from the chromatograph. The trap contents are examined by nuclear magnetic resonance spectroscopy, and the amount of methacrylonitrile (0.116 mole) present in the original distillate is calculated from comparison of the integrated area of an appropriate portion of the spectrum with the integrated area of what portion of the spectrum due to the protons in 1,2-dichloroethane. In a similar manner, a known weight of dioxane is added to a known weight of the distillate, the resulting mixture is subjected to gas chromatography, and the cis- and trans-crotononitriles, allyl cyanide, and dioxane are collected in a single trap as they emerge from the chromatograph. Analysis of the trap contents by nuclear magnetic resonance spectroscopy, by comparison of the integrated areas of appropriate portions of the spectrum with that due to the protons in dioxane, fixes the amounts of trans-crotononitrile (0.026 mole), allyl cyanide (0.0023 mole) and cis-crotononitrile (0.0022 mole) in the original distillate. Thus, the reaction produces 0.1465 mole of butenenitriles (37.6 percent yield based on hydrogen cyanide, corresponding to a catalyst turnover of 48) composed of 79.2 percent methacrylonitrile, 17.7 percent trans-crotononitrile, 1.6 percent allyl cyanide and 1.5 percent cis-crotononitrile.

EXAMPLE III

The reaction is conducted as in Example II, except that the temperature is 80° C., 2.0 g. (0.00154 mole) of nickel compound is employed, and the flow rate of hydrogen cyanide is 0.00195 mole/min. After the passage of 0.390 mole of hydrogen cyanide, the reaction is stopped and the reaction mixture is processed as in Example II to yield 2.5 g. of residue and 40.5 g. of distillate. Gas chromatography of the distillate reveals the presence of all four butenenitriles in approximately the same proportion as observed in Example II. By comparison of peak heights on the gas chromatograms with those in Example II, the yield of butenenitriles is calculated as ca. 0.0366 mole (ca. 9 percent yield based on hydrogen cyanide).

EXAMPLE IV

The apparatus is the same as that described in Example II. Into the flask, which is maintained under an atmosphere of nitrogen, are introduced 50 ml. of p-xylene, 1.3 g. (0.0075 mole) of nickel tetracarbonyl and 5.0 g., (0.030 mole) of triethyl phosphite. Stirring is started, and the flask is placed in an oil bath which is gradually heated to 120° C. in order to produce the catalyst, which is a mixture of triethyl phosphite nickel carbonyl of the general formula $Ni[P(OC_2H_5)_3]_n[CO]_{4-n}$, where $n$ is 1, 2 and 3; and predominantly 2 and 3. A gaseous mixture of methacetylene (at a flow rate of 0.00262 mole/min.), hydrogen cyanide (at a flow rate of 0.00200 mole/min.) and nitrogen (at a flow rate of 5 ml./min.) is then passed over the solution while the temperature is maintained at 120° C. After the passage of 0.390 mole of hydrogen cyanide, the reaction is stopped and the reaction mixture is processed as in Example II to yield 5.1 g. of residue and 41.8 g. of distillate. Gas chromatography of the distillate reveals the presence of all four butenenitriles in approximately the same proportion as in Example II. By comparison of the peak heights on these gas chromatograms, with those in Example II, the yield of butenenitriles is calculated to be ca. 0.0044 mole (ca. 1.1 percent yield based on hydrogen cyanide).

EXAMPLE V

The reaction is run as in Example IV, except that 7.5 g. (0.0030 mole) of tri-n-butyl phosphite is added (producing as catalyst a mixture of tri-n-butyl phosphite nickel carbonyls of the general formula

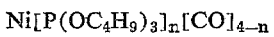

$$Ni[P(OC_4H_9)_3]_n[CO]_{4-n}$$

where $n$ is 1, 2 and 3; and predominantly 3), and the flow rate of hydrogen cyanide is 0.00213 mole/min. After the passage of 0.390 mole of hydrogen cyanide, the reaction is stopped and the reaction mixture is processed as in Example II to yield 8.6 g. of residue and 41.0 g. of distillate. Gas chromatography of the distillate reveals the certain presence of methacrylonitrile and trans-crotononitrile. By comparison of the peak heights on this chromatogram with those in Example II, the yield of butenenitriles is calculated to be ca. 0.0017 mole (ca. 0.4 percent yield based on hydrogen cyanide).

EXAMPLE VI

The apparatus is the same as that described in Example II. To the flask, maintained under an atmosphere of nitrogen, is added a slurry of 4.0 g. (0.00308 mole) of tetrakis[triphenyl phosphite]nickel $(Ni[P(OC_6H_5)_3]_4)$ in 50 ml. of p-xylene, stirring is started, and the flask is immersed in an oil bath maintained at 80° C. A gaseous mixture of hydrogen cyanide (at a flow rate of 0.00174 mole/min.) and nitrogen (at a flow rate of 5 ml./min.) is passed into the flask and, shortly after inception of flow, 9.8 g. (0.096 mole) of phenylacetylene is added to the p-xylene solution. After passage of 0.130 mole of hydrogen cyanide the reaction is stopped and the reaction mixture is submitted to evaporative distillation at room temperature and 0.01 mm. Hg. The residue amounts to 13.9 g., and the distillate to 42.4 g. Gas chromatography of the distillate reveals the presence of a single reaction product which is trapped as it emerges from the gas chromatograph and is identified as α-phenylacrylonitrile by infrared and nuclear magnetic resonance spectroscopy. From the intensities of the infrared and nuclear magnetic resonance spectra, the yield of α-phenylacrylonitrile is calculated as ca. 1.6 g. (ca. 0.012 mole, ca. 13 percent yield based on phenylacetylene).

EXAMPLE VII

Reaction is run as in Example II, except that the methylacetylene is replaced by acetylene (at a flow rate of 0.00323 mole/min.), the flow rate of hydrogen cyanide is 0.00185 mole/min., and the temperature is 50° C. After the passage of 0.390 mole of hydrogen cyanide, the reaction is terminated and the reaction mixture is processed as in Example II to yield 4.8 g. of residue and 39.3 g. of distillate. Gas chromatography of the distillate reveals the presence of a single reaction product which is trapped as it emerges from the gas chromatograph and is identified as acrylonitrile by infrared and nuclear magnetic resonance spectroscopy. By comparison of the gas chromatogram of the distillate with those of a series of synthetic mixtures of acrylonitrile in p-xylene, the yield of acrylonitrile is calculated to be 0.087 g. (0.00164 mole, 0.4 percent yield based on hydrogen cyanide).

EXAMPLE VIII

The reaction is conducted as in Example II, except that the solvent is acetonitrile (50 ml.), the temperature is 60° C., 4.0 g. (0.00154 mole) of catalyst is employed and the flow rate of hydrogen cyanide is 0.00177 mole/min. After the passage of 0.390 mole of hydrogen cyanide, the reaction is stopped and the reaction mixture is processed as in Example II to yield 4.5 g. of residue and 40.5 g. of distillate. Gas chromatography of the distillate reveals the presence of all four butenenitriles in approximately the same proportion as observed in Example II. The yield of methacrylonitrile, only, is assayed by a combination of gas chromatography and nuclear magnetic resonance spectroscopy as described in Example II. The reaction produces 0.0252 mole of methacrylonitrile (6.5 percent yield based on hydrogen cyanide).

EXAMPLE IX

The reaction is conducted as in Example VIII, except that the reaction mixture contains anhydrous zinc chloride (0.41 g., 0.003 mole) and the flow rate of hydrogen cyanide is 0.00170 mole/min. The reaction mixture is processed as in Example II and affords 5.7 g. of residue and 42.4 g. of distillate. Gas chromatography of the distillate reveals the presence of all four butenenitriles in approximately the same proportion as observed in Example II. Analysis of the distillate as in Example VIII indicates a yield of 0.0665 mole of methacrylonitrile (17 percent based on hydrogen cyanide).

EXAMPLE X

The reaction is conducted as in Example VIII, except that the reaction mixture contains anhydrous zinc chloride (0.41 g., 0.003 mole) and triphenyl phosphite (9.3 g., 0.030 mole) and the flow rate of hydrogen cyanide is 0.00190 mole/min. The reaction mixture is processed as in Example II and affords 14.0 g. of residue and 41.8 g. of distillate. Gas chromatography of the distillate reveals the presence of all four butenenitriles in approximately the same proportion as in Example II. Analysis of the distillate as in Example VIII indicates a yield of 0.068 mole of methacrylonitrile (17 percent based on hydrogen cyanide).

EXAMPLE XI

The reaction is conducted as in Example II, except that the catalyst is bis-[triphenyl phosphine]nickel dicarbonyl $Ni[P(C_6H_5)_3]_2[CO]_2$, (3.7 g., 0.0057 mole), the temperature is 70° C., and the flow rate of hydrogen cyanide is 0.0020 mole/min. After the passage of 0.390 mole of hydrogen cyanide, the reaction is stopped and the reaction mixture is processed as in Example II to yield 4.6 g. of residue and 43.0 g. of distillate. Gas chromatography of the distillate reveals the presence of methacrylonitrile and trans-crotononitrile as the predominant products and only traces of allyl cyanide and cis-crotononitrile. A quantitative estimate of the products is achieved by comparing the gas chromatography trace of the distillate with those of standard solutions of the butenenitriles in p-xylene. In this way, it is established that the total yield of butenenitriles is 1.77 g. (0.0264 mole, 6.8 percent conversion based on hydrogen cyanide) composed of 61 percent methacrylonitrile, 39 percent trans-crotononitrile, and less than 1 percent of allyl cyanide and cis-crotononitrile.

The acrylonitrile and substituted acrylonitriles produced by the present invention are useful as monomers in producing polyacrylonitrile, a widely used molding and fiber forming resin. These nitriles can be used to form the corresponding acids and amines which are conventional commercial products.

We claim:
1. A process of hydrocyanating the triple bond of a terminal alkyne of the formula $RC \equiv CH$ wherein R is selected from the class consisting of hydrogen, alkyl groups of from 1 to 6 carbon atoms and the phenyl group, comprising contacting said terminal alkyne with hydrogen cyanide in the presence of a nickel compound of the formula $Ni[PX_3]_n[CO]_{4-n}$, wherein $n$ is an integer of from 1 to 4 and X is selected from the class consisting of R' and OR' wherein R' is selected from the class consisting of alkyl and aryl groups of from 1 to 18 carbon atoms, which nickel compound is present in a molar ratio of from about 1:10 to about 1:1000 as based on said terminal alkyne, at a temperature of from 30 to 200° C. and recovering a nitrile having carbon-carbon unsaturation formed by the addition of hydrogen cyanide to the triple bond of said terminal alkyne.
2. The process of claim 1 wherein $n$ is 4.
3. The process of claim 2 wherein the pressure is from 0.5 to 100 atmospheres.
4. The process of claim 3 wherein the ratio of moles of hydrogen cyanide/moles of terminal alkyne is from 0.1 to 10.0.
5. The process of claim 4 wherein X is OR'.
6. The process of claim 5 wherein R' is an aryl group.
7. The process of claim 6 wherein R' is phenyl.
8. The process of claim 6 wherein R is methyl.
9. The process of claim 8 wherein R' is phenyl.
10. The process of claim 9 wherein R' is phenyl.

References Cited

UNITED STATES PATENTS 2,540,736   2/1951   Kalb et al. _____ 260—465.3 XR
2,571,099   10/1951   Arthur et al. _____ 260—465.3
2,762,834   9/1956   Gabbett et al. _____ 260—465.3

CHARLES B. PARKER, Primary Examiner

S. T. LAWRENCE III, Assistant Examiner

U.S. Cl. X.R.

260—465.3, 465.9